United States Patent [19]

Paster

[11] 4,043,955
[45] Aug. 23, 1977

[54] CONTINUOUS METHOD OF AGGLOMERATING AQUEOUS LATICES

[75] Inventor: Mark D. Paster, Worthington, Mass.

[73] Assignee: Monsanto Company, St. Louis, Mo.

[21] Appl. No.: 551,791

[22] Filed: Feb. 20, 1975

[51] Int. Cl.² .............................................. C08L 91/00
[52] U.S. Cl. .......................... 260/23.7 A; 260/23.7 R; 260/862; 528/486
[58] Field of Search ...................... 260/23.7 A, 23.7 R, 260/862; 528/486

[56] References Cited

U.S. PATENT DOCUMENTS

| | | | |
|---|---|---|---|
| 3,558,541 | 1/1971 | Dalton | 260/23.7 A |
| 3,681,276 | 8/1972 | Nagahisa | 260/23.7 A |
| 3,689,446 | 12/1969 | Furuya | 260/23.7 A |
| 3,789,046 | 1/1974 | Morl | 260/23.7 A |
| 3,814,709 | 6/1974 | Meissner | 260/23.7 A |

Primary Examiner—Melvyn I. Marquis
Assistant Examiner—W. E. Parker
Attorney, Agent, or Firm—Joseph S. Nelson; William J. Farrington; James C. Logomasini

[57] ABSTRACT

There is disclosed a continuous method for agglomerating lactices of a polymer to provide large particles. An acid anhydride solution is continuously admixed with an aqueous latex of a polymer followed by passing the admixture through a conduit with laminar-flow wherein the passage-time through said conduit is sufficient to hydrolyze the acid anhydride and produce agglomeration of said particles providing an agglomerated admixture followed by continuously stabilizing said agglomerated admixture with an emulsifying material providing a stabilized agglomerated latex.

31 Claims, 8 Drawing Figures

CONTINUOUS METHOD OF AGGLOMERATING AQUEOUS LATICES

BACKGROUND OF THE INVENTION

Latices of various polymers are useful for a wide range of applications. In recent years, rubber latices have been widely employed for the manufacture of rubber-reinforced plastics such as impact styrene and ABS materials. Although rubbers may be mechanically admixed with such polymers, greatly improved results are obtained by providing chemical adhesion between the rubber phase and the matrix by grafting at least a portion of the matrix polymer onto the rubber particles. It has also been noted that the impact strength of the rubber-modified compositions at times is dependent upon the size of the rubber particles dispersed therein within certain limits so that there has been interest in increasing the size of the rubber particles obtained in conventional latex polymerization processes.

In U.S. Pat. No. 3,558,541 to William O. Dalton, issuing on Jan. 26, 1971, there is disclosed an improved batch process for agglomerating latices based upon the use of acid anhydrides and latices containing organic acid salts as the emulsifying agents. The acid anhydride destroys the emulsifying agent because of its higher ionization constant and the unstabilized latex permits the particles to collide and agglomerate into large particles which are subsequently stabilized.

This technique has proven highly effective in obtaining latices with particle sizes varying with the polymer and ranging up to about 1 micron. However, there has remained a desire to obtain even larger particles with some latices and a desire to reduce the amount of the relatively expensive acid anhydride and time required to obtain particles of a given size.

In U.S. Pat. No. 3,551,370 to William O. Dalton issuing on Dec. 29, 1970, there is disclosed an improved batch process for agglomerating aqueous latices of a suitable polymer wherein an inorganic electrolyte is added to the latex prior to admixture with a water-soluble acid anhydride. Such batch process handling large volumes of latex and anhydride solution, requires mixing in large stirred tank, hence has considerable difficulty in uniformly mixing said materials, time-wise, before the pH drops too far in localized areas and the mixing can then cause serious coagulation and nonuniformities batch to batch as well as loss of coagulated latex.

It is an object of the present invention to provide a novel continuous process for agglomerating relatively small particles in an aqueous latex into larger particles with good control over the range of particles produced and which affords improved economy and production rates.

It is also an object to provide such a continuous process which may be used with various latices of polymers having a composition providing a surface permitting fusion or bonding of colliding particles.

A further object is to provide such a continuous process which is particularly advantageous for producing large rubber particles useful as a reinforcing agent in various polymeric matrices.

A further objective is to overcome the problem of batch mixing large volumes of the agglomerating solution uniformly with large volumes of latex quickly, at reasonable temperatures for agglomeration, without creating sufficient shear in said admixture to cause serious coagulation. The present process provides continuous fast, uniform mixing of the feed streams in relatively small mixing zones followed by flow to a laminar-flow zone with low shear for controlled agglomeration.

SUMMARY OF THE INVENTION

It has been found that the foregoing and related objectives can be readily realized in a process of the present invention comprising:

A continuous process for agglomerating polymer particles in an aqueous latex, the steps comprising:

A. feeding continuously into a mixing zone an aqueous solution of a water soluble organic acid anhydride, while simultaneously feeding continuously into said mixing zone an aqueous latex of a low heat distortion polymer, said polymer being formed from at least one ethylenically unsaturated monomer, the particles of said polymer being small and adherent upon collision and said latex containing an emulsifying agent, which is a salt of an organic acid with an ionization constant lower than that of the acid of the anhydride;

B. mixing continuously said solution of said water soluble organic acid anhydride with said latex in said mixing zone forming an admixture;

C. passing continuously said admixture from said mixing zone through a perforated member forming a wall section of said mixing zone through a perforated member forming a wall section of said mixing zone into an interconnected conduit;

D. flowing continuously, said admixture under laminar flow, induced by said perforated member, through said conduit wherein said admixture has a passage-time through said conduit sufficient to hydrolyze the acid anhydride, agglomerating the particles of the polymer to a predetermined size, forming an agglomerated admixture;

E. moving continuously said agglomerated admixture from said conduit through a low-shear zone being interconnected at one end portion to said conduit and having a withdrawal port at an opposite end portion;

F. stabilizing continuously said agglomerated admixture moving through said low-shear zone by adding an emulsifying material selected from the group consisting of an acid-stable emulsifying compound or a basic compound and combinations thereof, said stabilizing being prior to subjecting said agglomerated admixture to substantial shear which would cause coagulation of said agglomerated admixture; and G. withdrawing continuously said stabilizing agglomerated admixture from said low-shear zone at said opposite end by a withdrawal means providing flow-mixing in said stabilized agglomerated admixture.

The process of this invention can be carried out in various apparatus, preferably in an apparatus which is disclosed in copending application, Ser. No. 551,792, Attorney Docket No. 08-12-0296 of Mark D. Paster filed of even date herewith and comprising:

A. a mixing zone having a first feed port for an agglomerating solution stream, a second feed port for a latex stream, a mixing means located in said zone to mix said feed streams forming an admixture, a perforated member, forming at least a portion of a wall section of said mixing zone, said member providing a flow-through port for said admixture inducing laminar-flow in said admixture, B. an annular conduit to carry said laminar-flowing admixture having a first orifice coinciding and interconnected with said perforated member and a second orifice in an opposite end of said conduit, C. a low-shear zone having a first inlet port in one end of said low-shear zone interconnected with said second orifice of said conduit to carry an agglomerated admixture at least one additional inlet port located in an opposite end of said low-shear zone for feeding an emulsifying material to stabilize said agglomerated mixture and an outlet port in said opposite end, D. a withdrawal means, interconnected with said outlet port of said low-shear zone, for said stabilized agglomerated admixture.

DRAWINGS

The present invention is better understood by reference to the attached drawings wherein.

DESCRIPTION OF THE PREFERRED EMBODIMENTS

As will be readily appreciated, various factors affect optimum operation of the process and the several variables must be considered in determining the process conditions required for a given latex and/or a given particle size increase. The effect of such variables will be discussed at length hereinafter and illustrated in the examples.

The Polymeric Latex

The aqueous latices which may be used in the present invention are those of polymers having low heat distortion properties with particles having surfaces sufficiently soft or tacky under the conditions of operation so that the particles will adhere to each other upon collision once the protection of the emulsifying agent is removed or impaired. Such polymers may be inherently soft and/or tacky such as rubbers or they may be rendered so by swelling with a solvent prior to the process of the present invention.

Thus, the low heat distortion polymers with which the present invention may be employed are the rubber polymers such as the diene rubbers, polyisoprene rubbers, acrylate rubbers, ethylene-propylene rubbers and mixtures thereof.

The preferred latices are those of diene rubbers or mixtures of diene rubbers, i.e., any rubbery polymers (a polymer having a second order transition temperature not higher than 0° centigrade, preferably not higher than −20° centigrade, as determined by ASTM Test D-746-52T) of one or more conjugated, 1,3-dienes, e.g., butadiene, isoprene, piperylene, chloroprene, etc. Such rubbers include homopolymers of conjugated 1,3-dienes and copolymers or block copolymers with up to an equal amount by weight of one or more copolymerizable monoethylenically unsaturated monomers, such as monovinylidene aromatic hydrocarbons (e.g., styrene; an aralkylstyrene, such as the o-, m- and p-methylstyrenes, 2,4-dimethylstyrene, the arethylstyrenes, p-tert-butylstyrene, etc.; an alpha-alkylstyrene, such as alpha-methylstyrene, alpha-ethylstyrene, alphamethyl-p-methylstyrene, etc.; vinyl naphthalene, etc.); arhalo monovinylidene aromatic hydrocarbons (e.g., the o-, m- and p-chlorostyrene, 2,4-dibromostyrene, 2-methyl-4-chlorostyrene, etc.) acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butylacrylamide, etc.); unsaturated ketones (e.g., vinyl methyl ketone, methyl isopropenyl ketone, etc.) alpha-olefins (e.g., ethylene, propylene, etc.); pyridines; vinyl esters (e.g., vinyl acetate, vinyl stearate, etc.); and vinyl and vinylidene halides (e.g., the vinyl and vinylidene chlorides an vinylidene chlorides and bromides, etc.); and the like.

A preferred group of rubbers are those consisting essentially of 75.0 to 100.0 percent by weight of butadiene and/or isoprene and up to 25.0 percent by weight of a monomer selected from the group consisting of monovinylidene aromatic hydrocarbons (e.g., styrene), and unsaturated nitriles (e.g., acrylonitrile) or mixtures thereof. Particularly advantageous substrates are butadiene homopolymer or interpolymers of 90.0 to 95.0 percent by weight butadiene and 5.0 to 10.0 percent by weight of acrylonitrile or styrene.

As the content of a non-rubbery monomer is a rubber copolymer approaches 50 percent by weight of the interpolymer, there is a tendency to form coagulum so that the preferred rubbery interpolymers will normally contain less than about 35.0 percent of a non-rubbery monomer, particularly when such a monomer is polar.

Although the rubber polymer may contain minor amounts of a crosslinking agent, generally less than about 2.0 percent by weight, excessive crosslinking of the polymer should be avoided since it renders the surface of the particles relatively hard and the particles do not adhere to each other upon collision. Subsequent to agglomeration in accordance with the present invention, the particles may be highly crosslinked if so desired with possible benefits in agglomerated particle stability, although high crosslinking may be undesirable for some processes to which the rubber may later be subjected and wherein solution or optimum dispersion of the rubber is desired.

The polymeric solids content of the latices may vary from as little as about 5.0 percent by weight to as much as about 60.0 percent by weight; the preferred latices contain about 20.0 to 40.0 percent solids. The more dilute latices are not so conducive to formation of optimum particle size within reasonable time periods and the more concentrated latices sometimes tend to introduce a need for more critical process control. Generally, however, the particle size of the agglomerate increases with increasing solids content in the latex.

The latex must contain an emulsifying agent which is the salt of an organic acid with an ionization constant which is lower than that of the anhydride to be used in the process, such as, for example, the conventionally employed fatty acid soaps such as sodium oleate, sodium stearate, sodium palmitate, the equivalent potassium salts, and mixtures thereof such as rubber reserve soap. Generally, such fatty acid soaps may be characterized as the alkali metal salts of the $C_{12}$-$C_{22}$ aliphatic acids although ammonium salts may be useful in some limited applications. In addition, the latex may contain other emulsifying agents such as the anionics or nonionics so long as these other emulsifying agents are not present in such a concentration as to render the latex stable to the acid anhydride. As will be appreciated, the amount of the emulsifying agent will normally vary with the concentration of the latex and the particular polymer involved; latices containing substantial excesses of emulsifying agent over that required for stability are not desirably employed.

The Acid Anhydride

Various organic anhydrides may be used in the present invention if they possess the requisite degree of water solubility, and a relatively high ionization constant from the acid components. To be effective, the acid anhydride must be sufficiently water soluble to hydrolyze and provide acid radicals for reaction with enough emulsifying agent to reduce the stability of the latex for collision of the particles and the resultant agglomeration. The ionization constant will be dependent upon that of the particular acid of the emulsifying agent, but generally, the water-soluble acid anhydrides have significantly higher ionization constants than the conventionally employed alkali metal soaps.

Illustrative of the acid anhydrides are acetic acid anhydride, maleic acid anhydride, and propionic acid anhydride. Whether the acid is saturated or dicarboxylic appears to be of no significance. In order to achieve the desired homogeneous admixture within the latex rapidly and prior to appreciable hydrolysis, it may be desirable to admix the anhydride initially with an organic solvent therefor which is readily miscible with water. For example, methanol, ethanol and acetone may be used advantageously to dissolve maleic acid anhydride and propionic acid anhydride and even the more highly soluble acetic acid anhydride, ratios of 1-3 parts solvent per part of anhydride being satisfactory. The resultant organic solution may then be admixed with a small volume of water which is then added to the latex. Alternatively, the more soluble anhydrides are desirably dissolved in a small volume of water which is then added to and admixed with the latex so as to obtain a homogeneous admixture rapidly. Heat may also be used to facilitate instant solution of the anhydride in a carrier for addition to the latex, but premature hydrolysis of the anhydride should be avoided.

The amount of anhydride required will vary with the amount of the emulsifying agent present in the latex which is to be reacted therewith, and with the desired size of the agglomerated particles to be obtained. In addition, it has been noted that the acid anhydride tends to be more effective in latices of rubber interpolymers containing polar monomers since increasing the amount of polar monomer tends to decrease the amount of anhydride required for equivalent particle size increase.

Although amounts of anhydride equal to one-tenth the stoichiometric equivalent of the emulsifying agent (a molar ratio of 1:20 since there are two acid radicals) will produce some agglomeration in most instances, the amount employed is preferably at least one-fourth the stoichiometric equivalent. For optimum operation, the acid anhydride is added in excess of the stoichiometric equivalent of the emulsifying agent, and oftentimes, several times in excess thereof. Amounts in excess of five times the stoichiometric amount provide no significant additional benefit in terms of speed and may interfere with the stability of the agglomerated latex or with the properties of the polymer by introducing excessive acidity or corrosive action.

The Agglomerating Reaction

As previously indicated, the acid anhydride must be homogeneously distributed throughout the latex to achieve proper results. However, the admixture of the anhydride and the latex must be effected prior to appreciable hydrolysis of the anhydride or under conditions of minimal agitation. If the anhydride has hydrolyzed and the latex-anhydride mixture is subjected to appreciable agitation, the polymer particles tend to coagulate rather than agglomerate under controllable conditions and the coagulum cannot be utilized.

Accordingly, the anhydride or any carrier solution thereof should be dispersed throughout the latex rapidly prior to appreciable dissociation of the anhydride. Thus, carrier solutions of the anhydride with water should not be allowed to stand for long periods or should be maintained under conditions which inhibit hydrolysis of the anhydride such as by storage under refrigeration. It may be desirable in some instances to admix the anhydride and the latex at chilled temperatures to minimize hydrolysis, but, generally, the relatively low rate of hydrolysis of the anhydrides will permit admixture by conventional agitation techniques.

The temperature at which the agglomerating reaction is conducted has not been found to exert any appreciable effect upon the size of the agglomerated particles although it does influence the time required for the reaction to take place and to produce the desired particle size as indicated above. Since the rate of hydrolysis of the anhydride tends to be reduced by a decrease in temperature and the Brownian movement of the particles also tends to be reduced, the time required for equivalent results is extended by decrease in temperature but the reaction can be performed satisfactorily at any temperature above the freezing point of the latex so long as the anhydride is sufficiently soluble at that temperature. Conveniently, the agglomeration reaction carried out in the conduit is conducted at ambient temperatures or above preferably in the range of 30 to 50° C. for flow-through or passage-times of 0.5 to 60 minutes, preferably 0.5 to 10 minutes. Longer periods and higher temperatures may be employed with no significant benefit.

The particle size of the agglomerate can be varied by selecting the conditions of the agglomerating reaction such as time, temperature, anhydride and ratio of anhydride to emulsifying agent. In addition, the particle size will tend to increase with increase in the solids content of the latex. With the present invention, it is possible to readily obtain an increase in particle size diameters from original latex particles, in the range of 0.01–0.2 micron (weight average), to agglomerated latex particles of 0.1–0.8 microns. Particles as large as 0.8–1.0 microns and even larger have been obtained with some latices depending on their emulsifying system. The weight average particle size diameter can be determined by a published procedure of Graves, M. J. et. al., "Size Analysis of Subsieve Powders Using a Centrifugal Photosedimentometer", British Chemical Engineering, 9:742-744 (1964). A Model 3000 Particle Size Analyzer from the Martin Sweets Company, 3131 West Market Street, Louisville, Kentucky was used.

Stabilization of the Agglomerated Latex

After the agglomerating reaction has proceded to the desired extent, the agglomerated latex must be stabilized before it is subjected to any great measure of agitation to avoid formation of coagulum. This may be effected by adding a separate, acid-stable emulsifying agent or by adding a basic alkali metal compound to react with the acid of the emulsifying agent originally present and thereby regenerate the alkali metal soap in sufficient amount to provide stability. In either instance, the agitation required to disperse the added material throughout the latex should be minimized, and the emulsifying agent or alkali metal compound is desirably added in aqueous solution to facilitate dispersion and minimize undesirable agitation. After dispersion of the stabilizer has been effected, the latex may be agitated as required for subsequent processing and other reactions such as grafting and the like.

The amount of the stabilizing emulsifying agent may vary from as little as about 0.03 to 15.0 parts per 100 parts of polymer, and even higher since there is no tendency for the agglomerated particles to redisperse. Generally, amounts of about 0.07–3.00 parts per 100 parts polymer, and preferably 0.1–1.0 part, are utilized.

Among the added emulsifying agents which may be employed are anionic emulsifying agents such as alkali metal salts of long chain sulfonic acids and sodium dodecyl diphenyl bisulfonate, and nonionic emulsifying agents such as ethoxylated octyl phenol. Normally the non-ionic agents are required to be added in larger amounts than the anionics.

If the emulsifying agent is to be regenerated, an alkali metal hydroxide or other basic compound such as a carbonate is conveniently employed. The amount added is preferably at least the stoichiometric equivalent required to react with the anhydride added although somewhat smaller amounts may be used with some lessening in stability of the latex. Amounts of more than two times the stoichiometric equivalent may have an adverse effect upon some latices so that the preferred amounts are 0.9–1.5 times the stoichiometric equivalent of the anhydride (1.8–3.0 times the molar amount of anhydride).

The Inorganic Electrolyte

Various water-soluble monovalent and polyvalent metal and ammonium salts may be used as the inorganic electrolyte including halides, sulfates, nitrates and phosphates depending upon the latex and the presence of radicals therein which might be adversely effected thereby. Exemplary of the materials which have been advantageously employed are magnesium sulfate, aluminum sulfate, sodium chloride, potassium chloride, sodium sulfate, ammonium chloride, ammonium sulfate and similar phosphate salts, etc. From the standpoint of minimizing contamination the preferred electrolyte are the salts of the alkali metals and ammonia. The alkali metal and ammonium halides and sulfates have proven highly advantageous from the standpoint of control, cost, minimal adverse effect upon the latices and optimum cooperation with the acid anhydride.

The amount of the inorganic electrolyte will vary with the particular latex, the particular acid anhydride and the amount thereof, and the particle size that is desired. Generally, beneficial effects are obtained with as little as 0.05 parts of the electrolyte per 100 parts of the polymer of the latex but preferably the amount of the electrolyte is at least 0.2 part per 100 parts of the latex polymer. The maximum amount of the electrolyte will vary with the particular acid anhydride and the particular electrolyte selected. With sodium chloride and one part of an acetic anhydride in a 38 percent solids polybutadiene latex, the maximum amount of electrolyte that can be added without causing coagulation is about 3.0 parts per 100 parts of the latex polymer. However, magnesium sulfate and aluminum sulfate may be used in larger amounts with some latices without producing coagulation of the latex.

The inorganic electrolyte may be added to the emulsion of the monomers before polymerization thereof to produce the latex polymer or it may be added to the polymerized latex. In the latter instance, care should be taken to introduce the electrolyte fairly slowly or in a dilute solution so as to avoid excessive concentration at any point within the latex and thus prevent coagulation. Efforts to add the electrolyte together with the acid anhydride have proven such a technique to be quite unreliable since coagulation occurs quite often.

In practice, the continuous agglomeration process has been found to be more easily controlled than the batch process of the prior art, producing a more uniform particle size, without batch to batch variations or serious coagulation.

Reading on the "Summary of the Invention" previously given:

Step (A) is carried out by feeding simultaneously and continuously an aqueous solution of a water soluble inorganic anhydride and an aqueous latex of a low heat distortion polymer. The feeding is carried out by proportional-feeding of stoichiometric amounts, already described, of said solution and said latex under pressure to said mixing zone while maintaining a feed-pressure in said mixing zone sufficient to overcome a pressure-head of said flowing admixture in said conduit and a pressure-drop of said admixture flowing through said perforated member, providing a flow-rate and passage-time for said admixture through said conduit sufficient to agglomerate said polymer particles to a predetermined size. Those skilled in the art will recognize that the feed-pressure will vary with the pressure-head or volume-head of the conduit primarily, as the pressure drop through the perforated member is relatively small. Preferably, the conduit will be inclined generally upward, most preferably being oriented in a substantially vertical position. In such positions the pressure-head will be larger and the feed pressures are increased accordingly. The feeds may be pressurized by any convenient means such as pumps, gravity feed or gas pressure. The feed streams are carried by pressure to the mixing zone as separate feeds entering the mixing zone, preferably, at ports in opposite sections of the mixing zone to insure that the feed streams mix quickly at a mixing interface insuring uniform admixture before excessive hydrolysis and agglomeration can occur.

The anhydride is a liquid and is soluble in water but is not readily dissolved, hence must be dispersed rapidly by high shear agitation so that it dissolves quickly. The anhydride is readily soluble in a temperature range of from about 5° to 50° C., preferably 20° to 40° C. Dissolving times of less than 10 seconds can be used, preferably less than 5 seconds. High-shear mixing means, colloiders or blenders are preferred for the continuous in-line dispersion and dissolving of the anhydride. Electronic or hydrodynamic ultrasonic sonifiers have been found to be practical, e.g., The "Sonifier-Disruptor" sold under that trade name by Heat Systems-Ultrasonic, Inc., of Plainview, L.I., N.Y. or the "Sonalator" sold under that trade name by Sonic Engineering Corp., Connecticut Avenue, Norwalk, Conn.

The anhydride is mixed with latex as quickly as possible in step (B) to insure a uniform admixture before additional hydrolysis of the anhydride occurs during mixing. When mixing at temperatures of 30° C. less than about 30 seconds is preferred, at 40° C. less than about 20 seconds and at 50° C. less than about 10 seconds. In operation, the dissolving time of the anhydride to form the solution and the mixing time to form the admixture is carried out under a time-temperature schedule to insure that the total time used is less than the time required to hydrolyze that amount of the anhydride equal to about 30% of the molar equivalent amount of the emulsifying agent contained in the latex before it passes on to the agglomeration step in the conduit. Preferably, the amount of hydrolysis is less than about 30% of the molar equivalent amount of the emulsifying agent ranging from about 10 to 20%, most preferably from about 5 to 10%.

If the latex contains a buffering agent, then the time for hydrolysis of the anhydride should be less than that time required to hydrolyze that amount of anhydride equal to 30% of the molar equivalent of the emulsifying agent plus the buffering agent contained in the latex. The average residence time of the admixture in the mixing zone is critical to the operation of the process. The pH of the average rubber latex to be agglomerated is commonly in the range of 9 to 10. As soon as the anhydride solution mixes with the latex the pH will decrease quickly in a residence time of seconds at temperatures of 30° to 50° C. preferred for efficient operations. The latex becomes shear sensitive as the pH drops below the pK value of the emulsifying agent, e.g., Rubber Reserve soap at about $pH7$. Hence, the admixture is passed out of the mixing zone before the pH decreases below the pK value of this emulsifying agent into the laminar-flow conduit where agglomeration does occur without agitation and coagulation. If the pH of the admixture drops below the pK of the emulsifying agent in the mixing zone the latex becomes too unstable to mix under high-flow agitation and serious coagulation can occur. The pH then is best controlled in the time-temperature cycles already described for dissolving and mixing the anhydride.

Step (B) is carried out by continuously mixing said solution and said latex under high-flow mixing agitation in said mixing zone to form an admixture. The flow rate in said admixture should be sufficiently high so as to admix as quickly as possible without coagulating the latex. Generally, the agitation is provided by high-flow agitators used to circulate the admixture such as propellers, flat blade turbines or multipaddle agitators having wall baffles positioned between paddles. The mixing step is carried out in a minimum average residence-time for the admixture in the mixing zone consistent with uniform mixing.

The high-flow agitation described takes place in a mixing zone designed to provide an average turnover value for said admixture in said mixing zone before leaving said zone such that the turnover value has a range of from about 3 to 10 per residence time of said admixture. Mixing performance in said mixing zone can be determined by the following equations for a turbine agitated continuous stirred tank (CST):

$$Q_p = 0.5 \, ND^3$$

$$T_N = (Q_p/V) \, t$$

where
 N = rpm of agitator (rpm)
 D = agitator diameter (ft.)
 $Q_p$ = agitator volumetric pumping rate (ft.$^3$/min.)
 t = CST residence time (min.)
 V = CST volume (ft.$^3$)
 $T_N$ = average number of CST turnover per average residence time The concepts of such design are well understood by those skilled in the art and can be found in reference: Gray, J. B., Uhl, V. W., Mixing Theory and Practice, Vol. 1, 205, 1966.

Preferably the mixing zone is a cylindrical tank having an agitator located generally in the center of the tank. The tank generally has a length to diameter ratio from about 0.3 to 2, preferably 0.5 to 1. The tank has an integral perforated member as a wall section of the tank wherein the diameter of the perforated member and the tank are about the same diameter, preferably the same diameter, as that of the conduit.

The preferred design provides uniform mixing throughout the tank and allows the admixture to flow uniformly through the perforated disk inducing laminar flow in the conduit, hence, providing high turbulent flow in the tank for mixing and substantially only laminar flow in the conduit as the admixture is passed under pressure through the mixing tank.

The agitators used in the mixing tank can be any conventional high-flow mixing agitator such as a turbine paddle or propeller type with a turbine type being preferred. The rotational speed of the agitator blades can vary with the size of the mixing zone which determines the diameter of the blades. Agitator tip speed is commonly used as a measure of the degree of agitation in a liquid mixing system. The tip speed (TS) of an agitator in ft./min. is given by the formula:

$$TS = \pi D_a x \text{ rpm}$$

wherein $D_a$ is the diameter of the agitator blades in ft. and rpm. is the rotational speed of the agitator in revolutions per minute. High flow agitation is obtained with top speeds in the range of 30 to 1500 ft./min., preferably 40 to 100 ft./min. The agitator can have a wiping blade attached to the shaft of the agitator displaced vertically from the turbine blades and operating to wipe the perforated member free of any coagulum that may form and have a tendency to build and fill the perforations. The wiping blade can be inclined against the face of the perforated member providing a wiping action with low drag forces and minimized mixing shear. As an alternative, the wiping blade can be positioned less than 0.5 inch preferably less than 0.25 inch from the perforated member, hence, cleaning the perforated member by the shear-flow of the admixture past the member.

The present process then has the great utility of providing a method of agglomerating large volumes of latex wherein the latex and anhydride are mixed continuously and quickly without coagulation in a relative small mixing zone with a minimum residence-time.

Step (C) is carried out by pressurized-flow through the mixing zone wherein the highly agitated admixture is continuously passed through a perforated member forming an integral wall section of the mixing zone into an interconnected conduit. The perforated member is preferably a perforated cylindrical plate which induces laminar-flow in the admixture as it flows through the member so that turbulence is minimized and coagulation will not occur as the admixture agglomerates in the laminar-flow conduit. The perforated member than acts as a breaker-plate that separates the high-flow turbulent flow in the mixing zone from the laminar-flow in the conduit such that the laminar flow is essentially free of any turbulence and the shear rate is less than about 1 sec.$^{-1}$ in the laminar-flow conduit.

The perforated member has a plurality of perforations and during operation of the process acts as a breaker plate, providing a back-pressure on the mixing zone side of the member sufficient to overcome the pressure differential, created by agitation in the mixing zone, equalizing said pressure differential across the perforated member in the mixing zone insuring and inducing laminar flow through the perforated member into the conduit. The perforated member, during operation, also provides a pressure drop, on the conduit side of the member, not less than about the highest pressure gradient in the mixing insuring laminar flow through the perforated member. The perforations preferably have a length to diameter ratio range from about 0.1 to 4 and the total free-area of the perforations is from about 1 to 10% of the total area of the perforated member. The perforated members have a diameter about the same diameter as the mixing zone and the conduit. In practice, the apparatus sizing is based on the size of the conduit needed to insure a passage-time for the admixture that will agglomerate a predetermined particle size consistent with a flow rate that has a shear-rate less than 1 sec.$^{-1}$. The conduits can vary from 4 to 24 inches or larger in diameter and their length size to give the volume through-put consistent with passage-time and a shear rate of less than 1 sec.$^{-1}$, e.g., 5 to 60 feet or longer. The perforated plate can have a thickness of 0.0625 to 0.50 inch with the perforation diameter sized as described. The apparatus is conveniently fabricated of stainless steel, preferably glass lined steel or glass.

Step (D) is carried out by continuously flowing the admixture under laminar flow through said conduit.

The passage time being sufficient to hydrolyze the anhydride sufficiently to agglomerate the particle size of the polymer to a predetermined size forming an agglomerated mixture. The particle size of the latex commonly ranges from about 0.01 to 0.2 microns in diameter and is agglomerated to particles ranging in average size from about 0.1 to 1.0 microns in diameter preferably averaging from about 0.3 to 0.8 microns. The particles formed are monodisperse having a narrow size distribution with a particle size dispersity range of 1.1 to 1.4 (weight average/number average particle diameter). The method for determining weight average particle size diameter has been described. The number average particle size diameter is determined by preparing a photomicrograph of a dispersion of the particles and measuring the particles determining the average diameter as a number average.

The anhydride hydrolyzes during the passage-time through said conduit dropping the pH from about 7 to any desired level between 3 and 7, the particle size determined by the ultimate pH reached, with the lower the pH the larger the particle. The pH can be controlled by stoichiometric control wherein the anhydride is added in the molar amounts needed to reach a predetermined pH value knowing the stoichiometric equivalents supplied by the emulsifying agent combined in the latex. The passage-time of the admixture through the conduit allows the agglomeration reaction to occur and the passage-time is controlled to a passage-time sufficient to produce a given particle size, said passage-time ranging from about 0.5 to 60 minutes preferably from about 1 to 10 minutes. Within this passage-time range, particles can be prepared ranging from about 0.2 to 1.0 microns in diameter preferably from about 0.3 to 0.8 microns (weight average).

To provide a predetermined dwell time, the conduit is sized to provide the passage-time needed. Generally, a length to diameter ratio of from about 10 to 36 is used, preferably 15 to 25 with the volume scaled to give a predetermined passage-time for the given flow rate through the column.

The diameter of the conduit is such that the shear at the wall of the conduit is less than about 1 sec.$^{-1}$ for latices that have pH lowered to less than 7 and become unstable. The shear rate at the wall can be approximated by the formula:

Shear Rate at Wall of Conduit = $(4Q/r^3)$ $Q$ = total volumetric flow rate (cu. ft./sec.)

$r$ = radius of conduit (ft.)

It is evident that the shear rate is sensitive to the radius (diameter) of the conduit. Hence, a minimum diameter consistent with a shear-rate of less than about 1 sec.$^{-1}$ is preferred. Conduits of 2 to 24 inches in diameter have been found practical with a 12 inch diameter conduit passing up to about 700 gal./hour of latex having about 30–40 percent by weight solids with a shear rate of less than about 1 sec.$^{-1}$. Those skilled in the art will appreciate that higher shear rates can be used depending on the stability of the latex to shear without coagulation.

The maximum diameter of the conduit is determined by the diameter of the mixing zone and perforated member. In one embodiment the conduit can be oriented generally upward, preferable in a substantially vertical position with the admixture flowing upwardly through the conduit.

The process can be operative with the conduit operating in a generally downward position with the admixture flowing downwardly through the conduit from a mixing zone feeding downwardly through a perforated member. The low shear zone becomes an extension of the conduit having at least one inlet port for adding the emulsifying material, stabilizing the agglomerated admixture. The withdrawal means interconnects with said low-shear zone in line, having an admixture liquid-level controlling means, such as a manometer-like piping arrangement, having a generally vertical pipe arm extending to an elevation sufficient to control the flow during operation of the process.

The process can be operated in a generally horizontal position with the conduit being oriented generally horizontally. The mixing zone feeds horizontally with axis of the zone orientally horizontally and the perforated member being oriented generally vertically in the downstream wall of the mixing zone interconnected with the horizontally oriented conduit. The low shear zone operates in a generally horizontal orientation being an extension of the conduit having a outlet port in a bottom section interconnected with a withdrawal means and a admixture liquid level control means, for contracting the flow during operation of the process.

The conduit can be temperatured controlled by a temperature control means, e.g., a heat exchange jacket so that the temperature gradient between the conduit and the laminar-flowing admixture is minimized and laminar-flow is maintained without shearing or mixing minimizing coagulation during the agglomeration reaction.

Step (E) is carried out by continuously moving the agglomerated admixture from said conduit through a low-shear zone being interconnected at one end portion with the conduit and having a outlet port at an opposite end portion. Said low-shear zone having a shear rate of less than about 1 sec.$^{-1}$. In a preferred embodiment, the low-shear zone is oriented generally horizontally as a flow-through chamber wherein a bottom wall section is integral with a first inlet port interconnected with said conduit and said outlet port. The chamber having upwardly extending side-wall sections such that the depth of the chamber in at least about twice the diameter of said conduit. The dimensions are such that the agglomerated admixture flows through with preferably a free upper surface for reducing shear and providing a surface for removal of possible floating coagulum formed upstream.

In a preferred embodiment of the present invention, the laminar-flowing admixture flows generally upward through said conduit in step (D) such that any low density coagulum formed during agglomeration is carried to the low-shear zone for flotation and removed in the low-shear zone with the conduit remaining essentially free of coagulum insuring laminar-flow.

Step (F) is carried out by continuously stabilizing said agglomerated admixture moving through said low-shear zone with an emulsifying material, said material being provided by means selected from the group consisting of adding an acid-stable emulsifying compound or regeneration of said salt by addition of a basic compound and combinations thereof, said stabilizing being prior to subjecting said agglomerated admixture to substantial shear which would cause coagulation of said agglomerated admixture. The stabilization of the agglomerated admixture has been described. The present process adds the emulsifying material to the agglomerated admixture in step (F) by ports located in the side-walls of the low-shear zone. In one preferred embodiment, at least one part can be located in the sidewall sections in the general proximity of an outlet port for said low-shear zone so that the emulsifying material can be added before flow-mixing occurs in the withdrawal means and the agglomerated admixture can be stabilized during flow-mixing without coagulation of the latex. The emulsifying material is pressure fed on a stoichiometric-basis in the range of from about 0.03 to 15 parts per 100 parts of latex removed at the outlet port. The emulsifying material can be fed through additional parts located in the withdrawal means, as one preferred embodiment, to insure additional stabilization of the agglomerated admixture. Such ports can be interconnected with pressurized nozzle or nozzle means to aid in the distribution of the emulsifying material in the withdrawal means which provides flow mixing. Another means for distributing the emulsifying means in the agglomerated admixture can be a bleed-device such as a porous sintered ring or a fibrous wick placed around the outlet port of the low shear zone to bleed the material into the flowing admixture. The low shear zone preferably has, as one embodiment, a liquid level control means interconnected with said withdrawal means to control the liquid level in the low-shear zone.

Step (G) is carried out by continuously withdrawing the stabilized agglomerated admixture from the low-shear zone by a withdrawal means providing flow-mixing in said stabilized agglomerated admixture. The flow-mixing in withdrawal step (G) is produced by a pressure-drop in the stabilized agglomerated admixture as it flows through the withdrawal means. In a preferred embodiment, the member can be an annular pipe interconnected with the outlet port and having at least one diameter reduction to speed flow and induce mixing. In line pipe-line mixers, commonly used in the industry, can be used.

In one preferred embodiment the level control means can be interconnected with said withdrawal means to control the liquid level in said low-shear zone.

In an embodiment of the present invention, the process can be run in parallel with two agglomerating processes preparing stabilized agglomerated admixtures of two different diameters, e.g., one process preparing particles of 0.3 microns and one process preparing particles of 0.6 microns and combining the two streams to prepare a feed stream having a bimodal particle size distribution which then can be grafted as a rubber phase for high impact strength polymers. The particle size can range from 0.1 to 1.0 microns (weight average) with the small particles preferably ranging from about 0.1 to 0.4 microns and the large particles preferably ranging from about 0.5 to 1.0 microns.

DETAILED DESCRIPTION OF THE DRAWINGS

Figure 1:
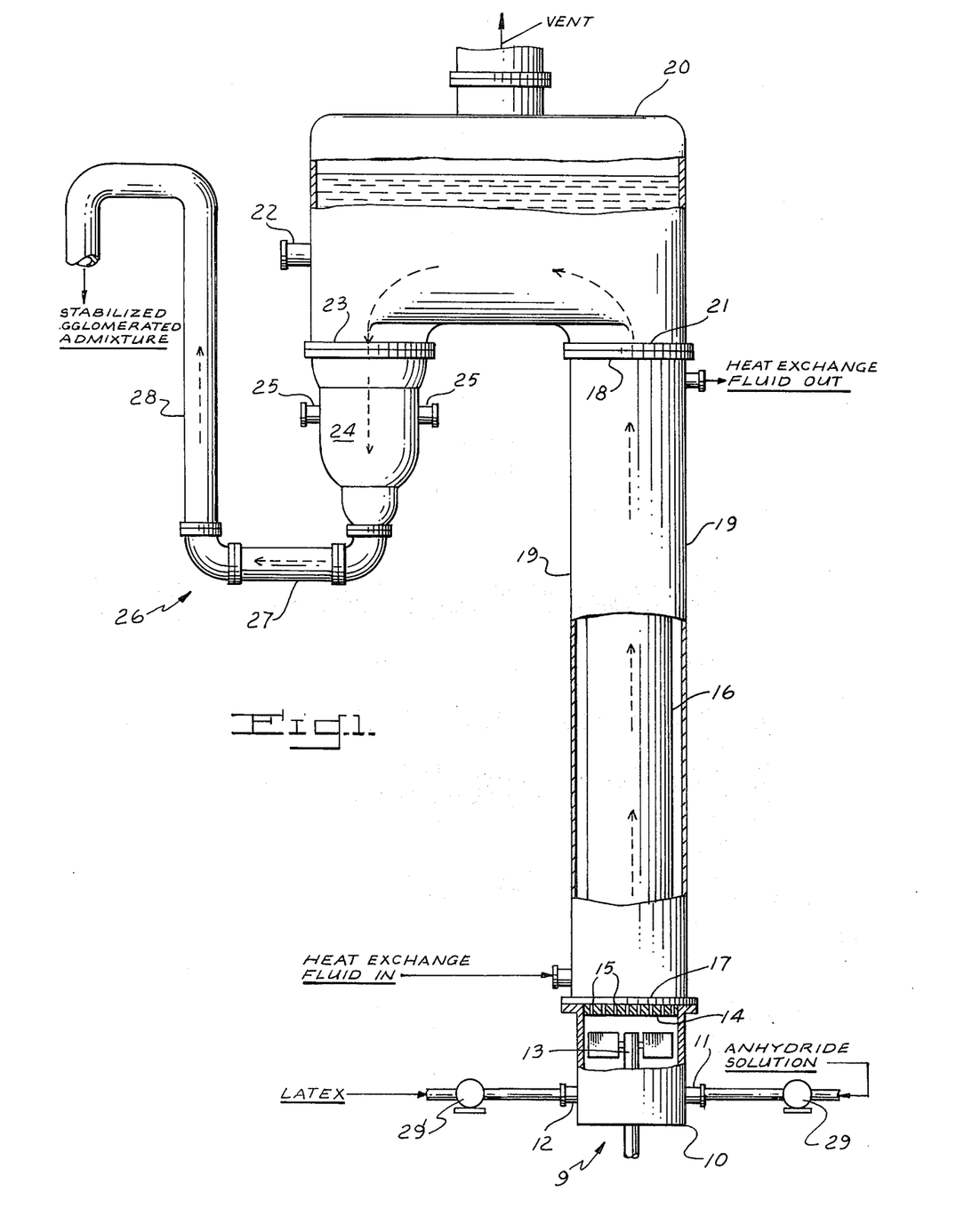
FIG. 1 is a diagrammatic side elevation view of an apparatus assembly suitable for the practice of the present invention with the conduit operating in a preferred substantially verticle position.

In FIG. 1, there is seen a mixing zone 9 comprising a cylindrical stirred tank 10, a first feed port 11 and a second feed port 12, a mixing means comprising a turbine agitator 13, a perforated member comprising a perforated cylindrical plate 14 having perforations 15. The stirred tank feeds through the plate into an annular conduit 16, having a first orifice 17 and a second orifice 18 and a temperature control means comprising a heat-exchange jacket 19. The conduit feeds into a low-shear zone 20 comprising a first inlet port 21, at least one additional inlet port 22 and an outlet port 23. The outlet port feeds into a withdrawal means comprising an annular pipe 24 having at least one diameter reduction, said pipe 24 having at least one inlet port 25. Said withdrawal means feeding into a manometer-like liquid-level control means 26 comprising a first pipe means 27 and a second pipe means 28. A first feed means comprising a pump 29 is interconnected with said first feed port 11 and a second feed means comprising a pump 29' is interconnected with said second feed port 12.

Figure 2:
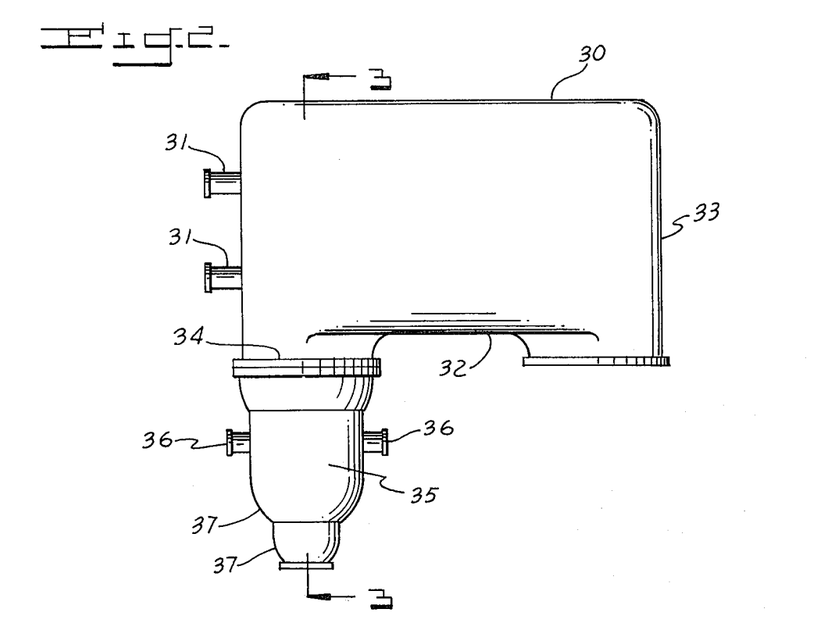
FIG. 2 is a diagrammatic side elevation view of the low shear-zone and withdrawal means showing additional feed ports for the emulsifying materials.

In FIG. 2, is seen a diagrammatic view of low shear zone 30 having additional inlet ports 31, an annular bottom wall section 32, upwardly extending side-wall sections 33, outlet port 34 and withdrawal means 35 have inlet ports 36 and diameter reductions 37.

Figure 3:
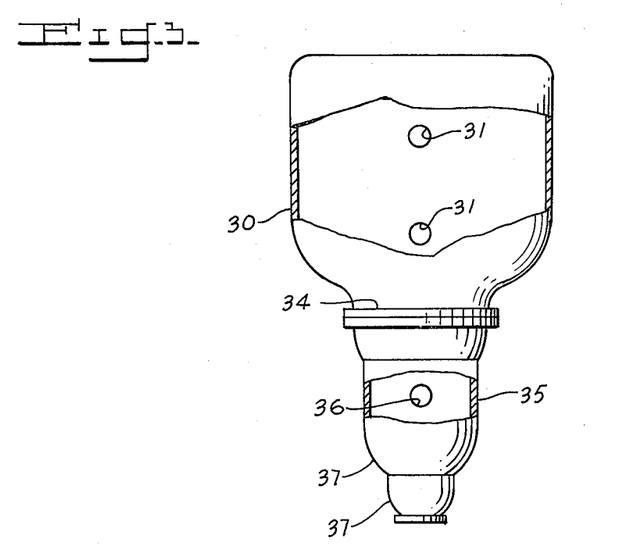
FIG. 3 is a diagrammatic end view of said low shear zone and said withdrawal means showing locations of feed ports.

In FIG. 3, is seen an end view of low-shear zone 30 and withdrawal means 35 through section 3—3. Said low shear zone having inlet port 31 and outlet port 34. Said withdrawal means having inlet port 36 and diameter reductions 37.

Figures 4, 5, 6:
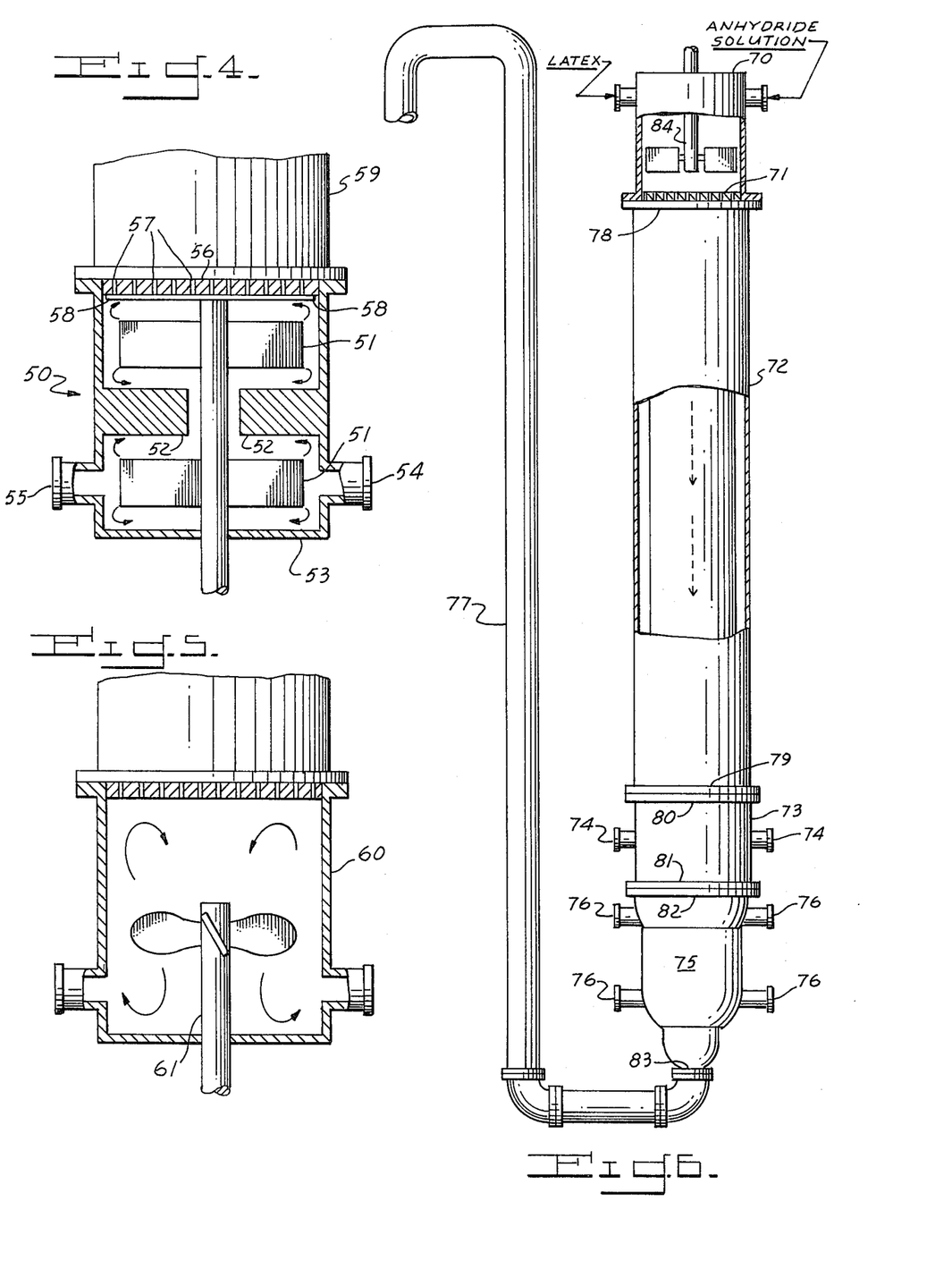
FIG. 4 is a diagrammatic view of a mixing zone comprising a cylindrical stirred tank having a multipaddle agitator with wall baffles positioned between paddles and a perforated member as a upper wall section interconnected with a conduit.
FIG. 5 is a diagrammatic view of a mixing zone comprising a cylindrical stirred tank having a marine-propeller agitator position generally in the center of the tank.
FIG. 6 is a diagrammatic view of an apparatus assembly for the process oriented such that the admixture flows generally downwardly through the conduit, during the operation of the process, showing essentially all of the elements of the apparatus necessary for operation of the process.

In FIG. 4, is seen a mixing zone 50 comprising a multipaddle agitator 51 having wall baffles 52 positioned between paddles, a stirred tank 53, a first feed port 54 and a second feed port 55. A perforated member 56 having perforations 57. Wiping blades 58 are shown attached to agitator 51 in contact with perforated member 56.

In FIG. 5 is seen a mixing zone 60 having a mixing means comprising a marine-propeller agitator 61.

In FIG. 6, is seen an apparatus assembly for the process operating such that the admixture flows generally downwardly through the annular conduit during agglomeration having mixing zone 70, conduit 72, perforated member 71, shear zone 73 having inlet port 74 and withdrawal means 75 having inlet port 76 and a liquid level control means 77, said conduit having a first orifice 78 and a second orifice 79, said low-shear zone having inlet port 80 and outlet port 81 said withdrawal zone having inlet port 82 and outlet port 83. Said mixing zone having agitator 84.

Figure 7:
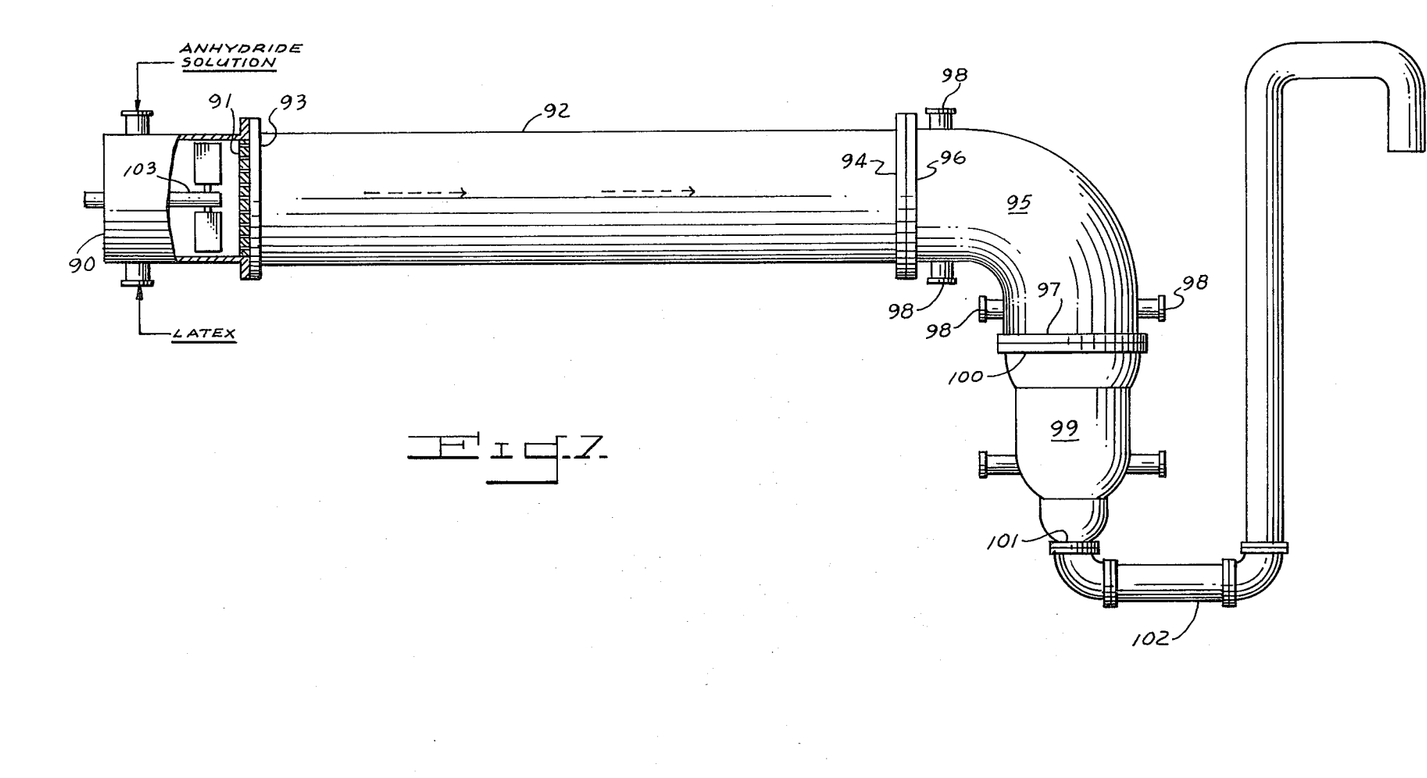
FIG. 7 is a diagrammatic view of an apparatus assembly oriented such that the admixture flows generally horizontally through the conduit, during the operation of the process, showing essentially all elements of the apparatus necessary for operation of the process.

In FIG. 7, is seen an apparatus assembly for the process operating such that the admixture flows generally horizontally through said annular conduit during agglomeration having a mixing zone 90, a perforated member 91, an annular conduit 92 having a first orifice 93 and a second orifice 94, a low shear zone 95 having a first inlet port 96, outlet port 97, additional input ports 98, a withdrawal means 99 having an inlet port 100, an outlet port 101 and a liquid-level control means 102, said mixing zone having an agitator 103.

Figure 8:
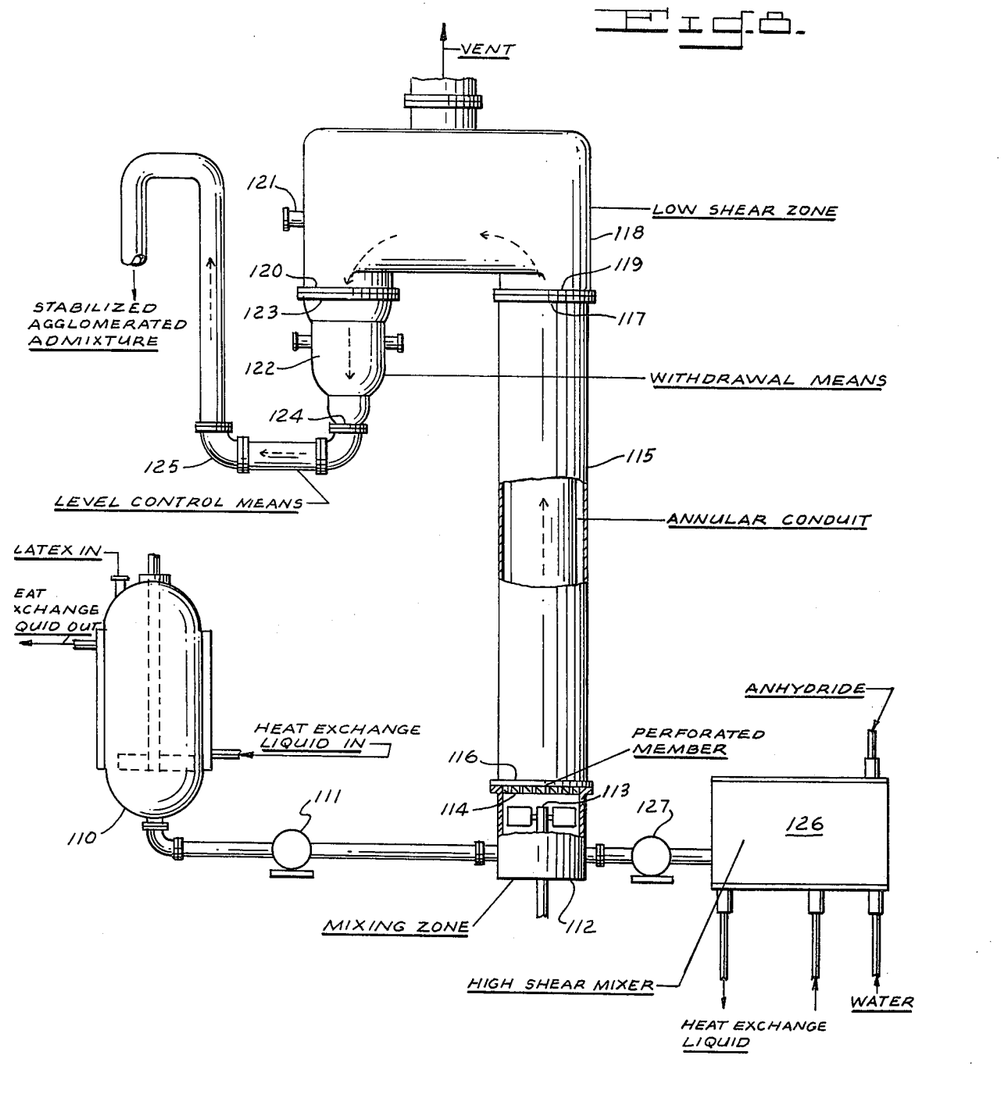
FIG. 8 is a diagrammatic view of an apparatus assembly (not to scale) showing essentially all the elements of the apparatus necessary for operation of the process including a feed system for the latex and mixing-feed system for the anhydride solution.

In FIG. 8, is seen a diagrammatic flow drawing illustrating (not in scale) a process as carried out in a continuous manner using the apparatus of the present invention comprising an agitated hold tank 110 for the latex fed from in a continuous reactor, not shown, said hold tank jacketed for temperature control, a pump 111 for pressure feeding the latex to a mixing zone 112 having an agitator 113, a perforated member 114, feeding an annular conduit 115 having a first flanged orifice 116 and a second flanged orifice 117 feeding a low-shear zone 118, having a first inlet port 119, an outlet port 120, additional inlet port 121, a withdrawal means 122, having an inlet port 123, an outlet port 124, and a liquid level control means 125, a high shear mixer 126 and a pump 127.

EMBODIMENTS

The following examples are set forth to illustrate more clearly disclose the principles and practice of the invention to one skilled in the art and are not intended to be restrictive but merely to be illustrative of the invention herein contained.

EXAMPLE 1

LATEX A

A latex is prepared by polymerizing butadiene and acrylonitrile to obtain a rubber polymer containing 97 parts butadiene and 3 parts acrylonitrile. The latex contains 40.0 percent solids and 1.2 parts of sodium oleate per 100 parts of latex (pphpl) and an emulsifying agent and 0.24 parts pphl of sodium sulfate during polymerization. The particle size of the polymer is observed to be 0.08 microns (weight average).

LATEX B

Part A is repeated with a latex containing 0.25 pphpl of sodium sulfate during polymerization. At the conclusion of the polymerization, 0.2 pphpl of additional sodium sulfate is added to the latex a 10 percent solution as an agglomeration additive. The particle size of the polymer is observed to be about 0.08 microns (weight average).

EXAMPLES 2 - 6

An apparatus of FIG. 8 is used having a mixing zone of FIG. 4 with a diameter of 2 inches and a length of 1.75 inches. Solutions of acetic anhydride are prepared by continuously mixing 15 pphpl (parts per hundred parts latex) of water and 0.2 to 0.8 pphpl of acetic anhydride with an Ultrasonic Sonifier Model W-185 having an average residence time of less than 10 sec. The perforated member of the mixing zone is a glass plate being 2 inches in diameter, one-eighth inch thick having 13 evenly spaced perforations one-eighth inch diameter providing a perforation area 5 percent of the area of the plate. The conduit is a glass column having a diameter of 2 inches and a length of 45 inches. The low shear zone has side-walls of 5 inches and a length of 10 inches running a 75 percent fillage with a free admixture surface. The low-shear zone has four inlet ports for addition of an emulsifying material (10 percent solution of dodecyl diphenylether disulfonate) added at the rate of 8 pphpl to stabilize the agglomerated admixture. The withdrawal means is a pipe having a 2 to 1 diameter reduction providing flow-mixing of the stabilized agglomerated admixture. The latex at 42° C. is fed to the mixing zone at 0.75 lbs./hr. simultaneously with a stream of the anhydride solution at about 25° C., forming the admixture by high shear mixing using an agitator tip speed of 45 ft./min.; passing the admixture through the perforated member inducing laminar flow in the conduit; flowing the admixture through the conduit at a calculated shear rate of 0.51 sec.$^{-1}$ for 8.9 minutes agglomerating the polymer particles followed by stabilizing the agglomerated admixtures and withdrawing said admixture through the withdrawal means with flow-mixing. Table 1 summarizes the experimental runs made, using anhydride solution feeds supplying anhydride ranging from 0.2 to 0.8 pphpl.

TABLE 1

| Exp. | Latex | Anhydride pphpl | Agglomerated Particle Size (microns)* |
|---|---|---|---|
| 2 | A | 0.8 | 0.48 |
| 3 | A | 0.4 | 0.36 |
| 4 | A | 0.2 | 0.12 |
| 5 | B | 0.6 | 0.74 |

TABLE 1-continued

| Exp. | Latex | Anhydride pphpl | Agglomerated Particle Size (microns)* |
|---|---|---|---|
| 6 | B | 0.4 | 0.29 |

*weight average

EXAMPLE 7

LATEX C

A latex is prepared by polymerizing butadiene and acrylonitrile to obtain a rubber polymer containing 95 parts butadiene and 5 parts acrylonitrile. The latex contained 40% solids and 1.2 parts of sodium oleate emulsifier. The polymerization was initiated by a redox system of iron and sodium formaldehyde sulfonxylate. The emulsion was further stabilized with acid stable emulsifying compound 0.02 pphpl of sodium dodecyl diphenyl ether disulfonate. The particle size of the polymer is observed to be about 0.10 microns (weight average).

EXAMPLES 8 – 9

The procedures of Experiment 2 were carried out using Latex C of Example 7. Table 2 summarizes the experimental runs made.

TABLE 2

| Exp. | Latex | Anhydride pphpl | Agglomerated Particle Size (microns) |
|---|---|---|---|
| 8 | C | 0.7 | 0.69 |
| 9 | C | 0.4 | 0.30 |

What is claimed is:

1. An improved process for agglomerating polymer particles in an aqueous latex, with a water soluble organic acid anhydride, the improvement comprising:
   A. feeding continuously into a mixing zone an aqueous solution of a water soluble organic acid anhydride, while simultaneously feeding continuously into said mixing zone an aqueous latex of a low heat distortion polymer, said polymer being a diene rubber polymer, the particles of said polymer being small and adherent upon collision and said latex containing an emulsifying agent, which is a salt of an organic acid with an ionization constant lower than that of the acid of the anhydride;
   B. mixing continuously said solution of said water soluble organic acid anhydride with said latex in said mixing zone forming an admixture;
   C. passing continuously said admixture from said mixing zone through a perforated member forming a wall section of said mixing zone into an interconnected conduit;
   D. flowing continuously, said admixture under laminar flow, induced by said perforated member, through said conduit wherein said admixture has a passage-time through said conduit sufficient to hydrolyze the acid anhydride, agglomerating the particles of the polymer to a predetermined size, forming an agglomerated admixture;
   E. moving continuously said agglomerated admixture from said conduit through a low-shear zone being interconnected at one end portion to said conduit and having a withdrawal port at an opposite end portion;
   F. stabilizing continuously said agglomerated admixture moving through said low-shear zone by adding an emulsifying material selected from the group consisting of an acid-stable emulsifiying compound or a basic compound and combinations thereof, said stabilizing being prior to subjecting said agglomerated admixture to substantial shear which would cause coagulation of said agglomerated admixture; and
   G. withdrawing continuously said stabilizing agglomerated admixture from said low-shear zone at said opposite end by a withdrawal means providing flow-mixing in said stabilized agglomerated admixture.

2. The process of claim 1, wherein said organic acid anhydride is selected from the group consisting of acetic acid anhydride and maleic acid anhydride, and mixtures thereof.

3. The process of claim 1, wherein said emulsifying agent is a fatty acid soap.

4. The process of claim 1, wherein said emulsifying material is regenerated from the acidified emulsifying agent by adding to said latex a basic alkali metal compound.

5. A process of claim 1, wherein said acid-stable emulsifying compound is selected from the group consisting of nonionic organic compounds and anionic organic compounds and mixtures thereof.

6. The process of claim 1, wherein said acid anhydride is initially dissolved in water of a volume less than that of said latex and said solution is fed in step (A) with said latex.

7. The process of claim 6, wherein a water-miscible organic solvent for said acid anhydride is admixed therewith in a ratio of about 1–3 parts solvent per part anhydride to facilitate solution in the water.

8. The process of claim 1, wherein said acid anhydride is fed in said solution in step (A) in a molar amount at least equal to one-half the molar amount of said emulsifying agent contained in said latex.

9. A process of claim 1, wherein said aqueous latex has present before feeding, said acid-stable emulsifying compound, selected from the group consisting of anionic and nonionic emulsifying compounds or mixtures thereof, in an amount less than that sufficient to render said latex stable to acid anhydride agglomeration.

10. A process of claim 9, wherein said acid-stable emulsifying compound is present in from about 0.01 to 1.0 parts per 100 parts of latex polymer.

11. A process of claim 9, wherein said acid-stable emulsifying compound is sodium dodecyl diphenylether disulfonate.

12. A process of claim 1, wherein said acid-stable emulsifying compound for stabilizing said agglomerated mixture in step (F) is added in from about 0.03 to 14 parts per 100 parts of latex polymer.

13. A process of claim 1, wherein said acid-stable emulsifying compound is sodium dodecyl diphenylether disulfonate.

14. A process of claim 1, wherein said aqueous latex has present before feeding a water soluble inorganic electrolyte being a salt of a cation selected from the group consisting of alkali metals, alkaline earth metals, ammonia and mixtures thereof.

15. A process of claim 14, wherein said inorganic electrolyte is an alkali metal halide.

16. A process of claim 14, wherein said inorganic electrolyte is present in from about 0.05 to 3.0 parts per 100 parts of latex polymer.

17. A process of claim 1, wherein said feeding of step (A) is carried out by proportional-feeding said solution and said latex to said mixing zone while maintaining a feed-pressure to said mixing zone sufficient to overcome the pressure-head of said flowing admixture in said conduit and the pressure-drop of said admixture through said perforated member, providing a flow-rate and passage-time for said admixture through said conduit sufficient to agglomerate said polymer particles to a predetermined size.

18. A process of claim 17, wherein said passage-time is from about 0.5 to 60 minutes.

19. A process of claim 1, wherein said mixing of step (B) is carried out with an agitator having blades turning at a tip speed ranging from about 30 to 1500 ft./min.

20. A process of claim 1, wherein said mixing of step (B) provides an average turnover value having a range of from about 3 to 10 per average residence time of said admixture, said average residence ranging from 10 to 30 seconds.

21. A process of claim 1, wherein the temperature of said flowing admixture of step (D) is controlled such that the temperature gradient between said conduit and said flowing admixture is controlled and minimized sufficiently to maintain laminar flow in said admixture.

22. A process of claim 1, the liquid-level in said low shear zone being controlled by a liquid-level control means.

23. A process of claim 22, said liquid-level control means being interconnected with said withdrawal means, controlling the liquid level in said low shear zone during the operation of said process.

24. A process of claim 1, wherein said flow-mixing in withdrawing step (G) is produced by lowering the pressure of said stabilized agglomerated admixture as it flows through salt withdrawal means, said means being an annular pipe having at least one diameter reduction.

25. A process of claim 1, said laminar-flowing admixture, flowing generally upward through said conduit in step (D) such that low density coagulum formed during agglomeration is carried to said low-shear zone for flotation and removal, said conduit remaining essentially free of said coagulum insuring laminar flow.

26. A process of claim 1, wherein said aqueous solution of a water soluble organic acid anhydride is continuously prepared by a simultaneously feeding said anhydride and said water into a high-shear mixing means such that said anhydride is dispersed and dissolved in said water having a temperature ranging from about 5 to 40° C. and passed through said high-shear mixing means in less than 10 seconds forming said solution being continuously fed to said agglomerating process.

27. A process of claim 1, wherein said mixing of step (B) provides an average residence time in said mixing such that the residence time is less than that time required to hydrolyze an amount of said anhydride equal to 30% of the molar equivalent amount of the emulsifying agent contained in said latex, said mixing step being carried out at a temperature ranging from about 20 to 50° C.

28. A process of claim 1, wherein said stabilized agglomerated admixture withdrawn in step (G) has present agglomerated polymer particles ranging from about 0.1 to 1.0 microns in diameter.

29. A process of claim 28, wherein said agglomerated polymer particles range from 0.1 to 0.4 microns.

30. A process of claim 28, wherein said agglomerated polymer particles range from about 0.5 to 1.0 microns.

31. A continuous process for agglomerating polymer particles in aqueous latices wherein the agglomerated polymer particles have a bimodal particle size distribution comprising, operating a first process of claim 1, wherein a first stabilized agglomerated admixture withdrawn in step (G) has present agglomerated polymer particles having polymer particles ranging from about 0.1 to 0.4 microns and simultaneously operating a second process of claim 1 wherein a second stabilized agglomerated admixture withdrawn in step (G) has present agglomerated polymer particles ranging from about 0.5 to 1.0 microns, admixing said first and second admixture and forming a third stabilized agglomerated admixture having a bimodal particle size distribution.

* * * * *